Figure 1:
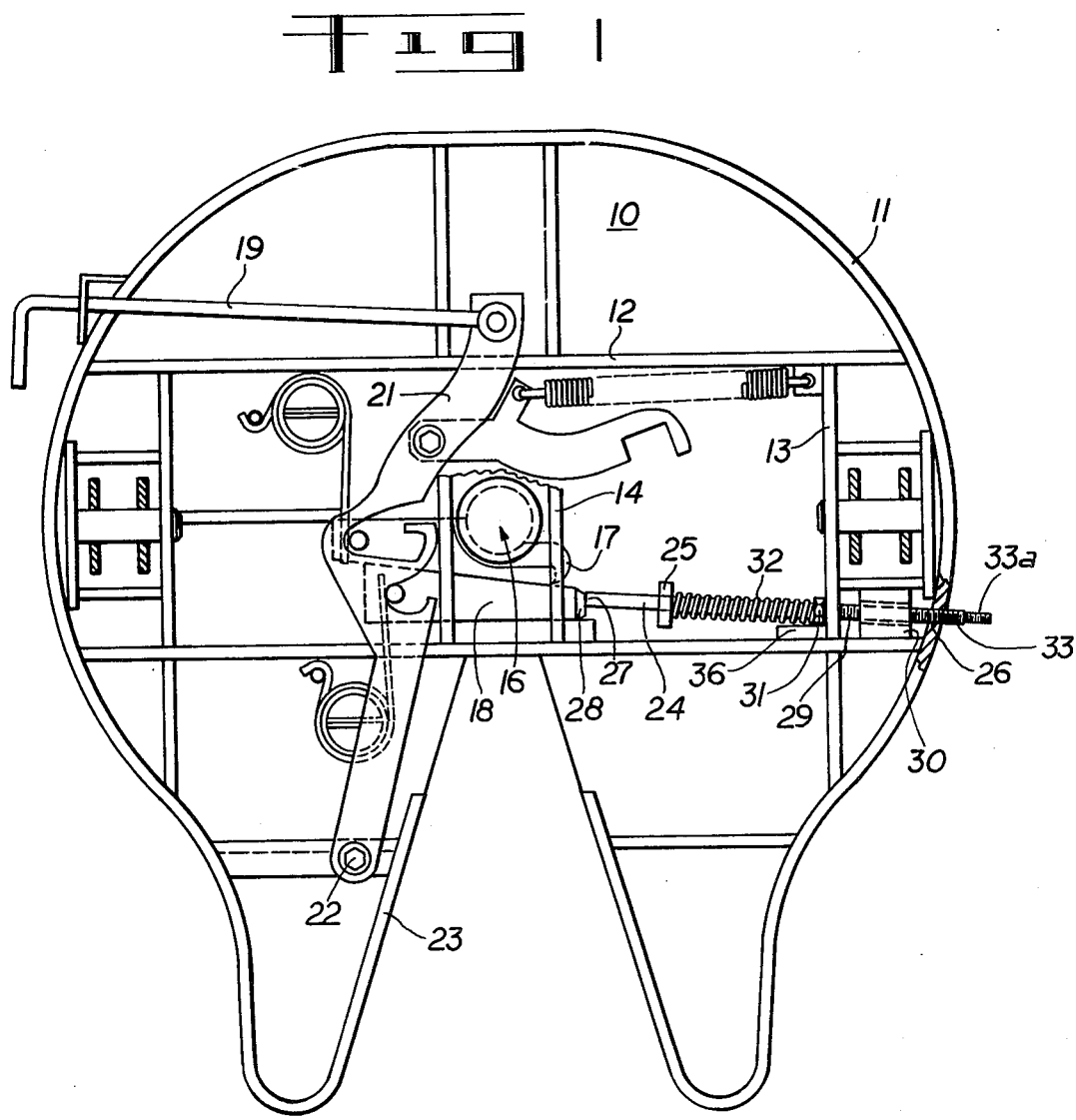

United States Patent [19]

Fontaine

[11] 4,140,328
[45] Feb. 20, 1979

[54] ADJUSTMENT AND RELEASE MECHANISM FOR WEDGE LOCKING MECHANISMS OF FIFTH WHEELS

[76] Inventor: John P. K. Fontaine, P.O. Box 6702, Birmingham, Ala. 35210

[21] Appl. No.: 826,351

[22] Filed: Aug. 22, 1977

[51] Int. Cl.² .............................................. B62D 53/12
[52] U.S. Cl. .................................................... 280/434
[58] Field of Search ............... 280/434, 433, 435, 436, 280/437

[56] References Cited
U.S. PATENT DOCUMENTS 3,844,584  10/1974  Fontaine .............................. 280/434
3,888,514   6/1975  Klein .................................... 280/434

Primary Examiner—John A. Pekar
Attorney, Agent, or Firm—Hugh P. Carter

[57] ABSTRACT

A fifth wheel of the kind having a king pin jaw and locking wedge is provided with means accessible from the outside of the fifth wheel to free the wedge in the event it becomes impossible to move the same with the usual operating handle. The member for moving the wedge is adapted to be struck with a tool such as a hammer to impart a shock force, thus to free the wedge. Also, the member is adjustable toward and from the wedge thus to permit the wedge to compensate for wear of the jaw.

4 Claims, 2 Drawing Figures

ADJUSTMENT AND RELEASE MECHANISM FOR WEDGE LOCKING MECHANISMS OF FIFTH WHEELS

This invention relates to fifth wheels for truck tractors and more particularly to an improvement in that type of said mechanisms which embody a wedge and jaw means for locking the fifth wheel about the king pin of the trailer.

In the art to which this invention relates it has been customary to hold the jaw of the fifth wheel into contact with the king pin by means of a slidable wedge. The wedge was held in place between a part of the frame of the fifth wheel and the off-king pin side of the jaw. Means is provided to unlock the mechanism by first moving the wedge to retracted position followed shortly thereafter by movement of the jaw, permitting the king pin to be removed from the fifth wheel. In some instances it has been found that the wedge was jammed so tightly in place that it was impossible to remove the same by means of the usual handle associated therewith. Further, in prior apparatus it has been necessary to limit the inward movement of the wedge so that in the event the king pin became oval shaped in the fore and aft direction of normal movement of the vehicle, there would be no overstressing of the parts when the tractor turned at substantially right angles to the trailer. In other words, when a king pin becomes worn it wears somewhat oval shaped in the fore and aft, normal towing direction of the vehicle. If the wedge continues to be forced inwardly, when it is permitted to move inwardly, thus to move the jaw closer to the king pin, then, when the tractor is manuevered so as to be substantially at right angles to the trailer, as when parking for unloading, etc., excessive force is placed upon the parts, causing undue stress on the several parts including the king pin, jaw and wedge and associated frame parts.

With the foregoing in mind an object of my invention is to provide means which shall serve both to limit the travel of the wedge and to provide ready means for disengaging a stuck or jammed wedge.

A further object of my invention is to provide mechanism of the character designated which is accessible from the exterior of the fifth wheel, facilitating the adjustment of the mechanism for wedge stop purposes and also providing readily accessible means for freeing a jammed or stuck wedge.

More specifically, I propose the use of a rod-like member mounted for sliding movement in the depending or vertically disposed portions of the frame of the fifth wheel. The said member is threaded for a length adjacent its outer end and interposed between two of the depending frame members is a spring. A nut is provided adjacent the spring so that the location of the inner end of the member relative to the end of the wedge may be adjusted. Further, simply by striking the projecting outer end of the member the entire member moves inwardly, thus to provide a hammer blow to the end of the jammed wedge, freeing the same, all of which is done from the exterior or outside of the fifth wheel.

Figure 2:
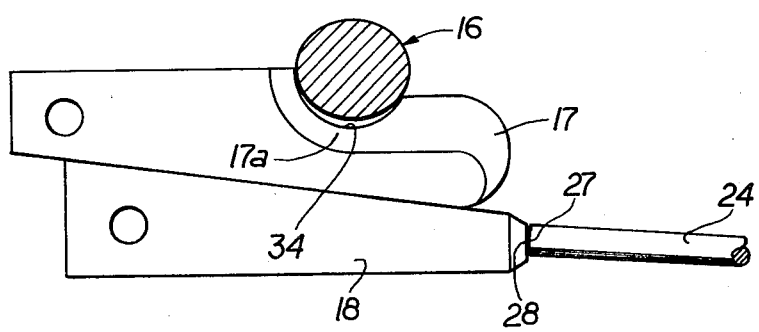

Apparatus illustrating features of my invention is shown in the accompanying drawing, forming a part of this application, FIG. 1 is a bottom view of a typical fifth wheel, certain parts being in section, showing my invention applied thereto; and, FIG. 2 is an enlarged fragmentary detail sectional view illustrating the condition of the parts due to wear which shows the need for the adjustment afforded by my improved wedge stop and freeing member.

Referring now to the drawings for a better understanding of my invention, I illustrate the same in association with a type of fifth wheel which is shown and described fully in my previous U.S. Pat. No. 3,844,584, Oct. 29, 1974. Thus, the fifth wheel comprises the top plate 10 from which depends a peripheral flange 11. Various intermediate members such as plates indicated at 12, 13 and 14 are secured to the under surface of the plate 10 to form the structure of the fifth wheel as a whole.

At 16 I illustrate a king pin which as shown is carried by the vehicle to be towed. The king pin is held in place by means of a jaw member 17 and the jaw in turn is held in locked condition or position by a sliding wedge 18.

At 19 I illustrate the usual operating handle which, through the bar 21 pivoted at 22, is adapted to unlock the mechanism. That is, the wedge and jaw are operatively connected to the lever 21 in such fashion that when the handle 19 is moved to the left as viewed in FIG. 1 the first action is for the wedge to be moved to the left, followed shortly thereafter by movement to the left of the jaw member. In this fashion the coupling is unlocked and the king pin may be withdrawn through the opening 23 of the fifth wheel, all as is understood in the art.

My invention comprises the combination with the wedge and jaw of means to limit wedging action of the wedge relative to the jaw and also to afford means to unlock the wedge in the event the same becomes frozen to the point that it cannot be unlocked with the handle 19. Oftentimes due to corrosion, icing conditions, etc., it is impossible to break the wedge loose by use of the handle 19. Therefore, my improvement is adapted to afford ready means for breaking the wedge loose if necessary.

As shown in the drawings, I provide a rod-like member 24 which is slidably mounted at 26 in a suitable opening in the flange 11. The wedge also is slidble in a block member 30 secured to the under framework of the fifth wheel and likewise is slidble through the member 13. An inboard support 25 welded to the underside of the plate 10 also slidably receives the rod-like member 24.

As shown, the inner end 27 of the rod-like member is in contact with the inner end 28 of the wedge 18.

The member 24 is provided with a threaded section 29 onto which is adjustably mounted a nut 31. A compression spring 32 is interposed between the nut 31 and the member 25 carried by plate 10.

It will be especially noted that the outer end of the member 24 indicated at 33 projects past the outer edge of the periphery of the skirt or flange 11. The outer end 33 therefore is accessible for striking with a hammer, thus to free the wedge by moving it to the left as viewed in the drawings.

From the foregoing the method of constructing and using my invention and the several advantages thereof may be now more fully explained and understood. As staged, the king pin 16, after long use has a tendency to wear somewhat to oval shape as shown in FIG. 2, the out of roundness of which is somewhat exaggerated in that FIG. When this occurs it is necessary to limit the righthand movement of the wedge 18 so that there will be a small space 34 left between the seat $17^a$ on the jaw and the king pin. The reason this is required is that when the driver of the tractor turns the tractor at right angles to the trailer being towed, the major axis of the now somewhat oval shaped king pin will come fore and aft, that is, in the direction of the normal travel of the vehicle. If the space as indicated is not provided it will readily be apparent that the long axis of the oval shape king pin will put an undue stress on the parts when the tractor is turned at right angles to the trailer as often happens in parking.

With my improved device one may adjust the righthandmost travel of the wedge, namely, the travel which tends to force the jaw against the king pin, by proper adjustment of the nut 31. In the event the wedge is stuck for any reason the end 33 may be struck with a hammer or the like, thus to deliver a shock load to the wedge and break it loose. As a matter of convenience the end 33 may be flattened as at 33$^a$ to permit rotation of the member 24 to adjust the position of the end 27 relative to the wedge. The nut is held against rotation by a member 36 against which a flat of the nut slidably rests.

The wedge is adjusted by inserting a two inch diameter (original diameter of the king pin) round rod in the fifth wheel and adjusting the member 24 so that the two inch rod bottoms in the jaw seat 17$^a$. This compensates for wear of the jaw seat and if the king pin is oval shaped as stated permits free, unbinding rotation of the king pin as above described.

In view of the foregoing it will be seen that I have devised an improved, simple and effective means both for limiting the movement of the wedge of a wedge-jaw fifth wheel toward locking position and also which is useful for freeing a frozen or otherwise stuck wedge.

While I have shown my invention in but one form, it will be obvious to those skilled in the art that it is not so limited, but is susceptible of various changes and modifications without departing from the spirit thereof.

What I claim is:

1. The combination with a fifth wheel of the kind having a frame, a king pin jaw and a movable wedge for holding the jaw in king pin retaining position,
    (a) a slidable member carried by the frame of the fifth wheel and disposed to limit movement of the wedge toward jaw retaining position, and
    (b) said member having a portion engageable with the wedge and another portion accessible from outside the fifth wheel frame which may be struck by a took, whereby a shock force may be applied to move the wedge from a position holding the jaw in king pin retaining position toward position for the jaw to release the king pin.

2. The combination as defined in claim 1 in which there is means to adjust the position of the movable member relative to the wedge, thereby to adjust the position of the wedge relative to the jaw when the jaw is in king pin retaining position.

3. Apparatus as defined in claim 1 in which there is spring means associated with the movable member urging the same away from the wedge, and adjustable stop means carried by said member for limiting the movement of the wedge toward jaw retaining position.

4. The combination with a fifth wheel of the kind having a frame embodying a top plate, there being a depending peripheral flange carried by the frame, intermediate frame members beneath the plate and depending from the same, together with a king pin jaw and a movable wedge for locking the jaw in king pin retaining position, of
    (a) a member slidably passing through the depending flange and selected ones of the depending members beneath the plate,
    (b) one end of the member being adapted to engage the wedge and limit its movement toward jaw locking position,
    (c) the other end of said member projecting past the outer surface of the peripheral flange of the fifth wheel and being accessible for striking by a tool,
    (d) a length of said member adjacent said other end being threaded,
    (e) a nut on said threaded section adapted to abut against one of the depending members beneath the plate thereby to limit the travel of the wedge toward king pin retaining position, and
    (f) a compression spring surrounding said member interposed between said nut and another of said depending members and disposed to bias said member away from the wedge and to hold said nut resiliently against said one of the depending members.

* * * * *